(12) United States Patent
Park et al.

(10) Patent No.: US 12,149,912 B2
(45) Date of Patent: Nov. 19, 2024

(54) DISPLAY DEVICE AND OPERATING METHOD THEREOF

(71) Applicant: LG ELECTRONICS INC., Seoul (KR)

(72) Inventors: Jongha Park, Seoul (KR); Dongyun Lee, Seoul (KR); Seokhee Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 268 days.

(21) Appl. No.: 17/631,954

(22) PCT Filed: Aug. 9, 2019

(86) PCT No.: PCT/KR2019/010088
§ 371 (c)(1),
(2) Date: Feb. 1, 2022

(87) PCT Pub. No.: WO2021/029447
PCT Pub. Date: Feb. 18, 2021

(65) Prior Publication Data
US 2022/0295206 A1    Sep. 15, 2022

(51) Int. Cl.
*H04S 3/00* (2006.01)

(52) U.S. Cl.
CPC .................. *H04S 3/006* (2013.01)

(58) Field of Classification Search
CPC .............. H04S 3/006; H04S 7/00; H04R 5/02
See application file for complete search history.

(56) References Cited

U.S. PATENT DOCUMENTS

| | | | |
|---|---|---|---|
| 10,136,221 B2 | 11/2018 | Yoshizawa et al. | |
| 2015/0016643 A1 | 1/2015 | Steffens | |
| 2015/0098896 A1 | 4/2015 | Noah | |
| 2016/0021481 A1 | 1/2016 | Johnson et al. | |
| 2018/0136898 A1 | 5/2018 | Shi et al. | |
| 2018/0165054 A1 | 6/2018 | Kang et al. | |
| 2019/0007782 A1 | 1/2019 | Suenaga et al. | |
| 2019/0253801 A1* | 8/2019 | Arteaga | H04R 5/027 |
| 2022/0124415 A1* | 4/2022 | Lee | H04S 7/30 |

FOREIGN PATENT DOCUMENTS

| | | |
|---|---|---|
| JP | 2010-154544 A | 7/2010 |
| KR | 10-0830039 B1 | 5/2008 |
| KR | 10-2015-0115918 A | 10/2015 |
| KR | 10-2016-0095377 A | 8/2016 |
| KR | 10-2018-0068202 A | 6/2018 |
| WO | WO 2018/064410 A1 | 4/2018 |

* cited by examiner

*Primary Examiner* — David L Ton
(74) *Attorney, Agent, or Firm* — Birch, Stewart, Kolasch & Birch, LLP

(57) ABSTRACT

A display device according to an embodiment of the present disclosure is to provide a display device for automatically configuring an audio channel suitable for a location of each of a plurality of external speakers when the plurality of external speakers are connected, and an operating method thereof, which establish each of the plurality of external speakers and transmit audio signals to the plurality of external speakers according to the established roles.

16 Claims, 15 Drawing Sheets

DISPLAY DEVICE AND OPERATING METHOD THEREOF

CROSS REFERENCE TO RELATED APPLICATIONS

This application is the National Phase of PCT/KR2019/010088 filed on Aug. 9, 2019, which is hereby expressly incorporated by reference into the present application.

TECHNICAL FIELD

The present disclosure relates to a display device and an operating method thereof, and more particularly, to a display device to which a plurality of external speakers are connected and an operating method thereof.

BACKGROUND ART

One of important goals of sound technology development is to make it possible to easily implement and consume natural realistic 3D sound, and accordingly, multi-channel audio signal processing technology and a stereophonic sound system using multiple speakers is being developed day by day.

In addition, with the development of such audio technology, the need for users to listen with good sound is gradually increasing.

Recently, video/sound playback devices such as TVs, smart phones, and tablets have become possible to connect to a plurality of external speakers via Bluetooth. Accordingly, various technologies are provided such that users can listen to multi-channel sound.

DISCLOSURE

Technical Problem

An object of the present disclosure is to provide a display device for automatically configuring an appropriate audio channel for the location of each of a plurality of external speakers when the plurality of external speakers are connected, and a method of operating the same.

An object of the present disclosure is to provide a display device for automatically configuring a multi-audio channel in consideration of a type, an installation environment, and the like of each of a plurality of external speakers, and an operating method thereof.

Technical Solution

A display device according to an embodiment of present disclosure comprises a display, an audio output interface configured to output sound, a wireless communication interface connected to a plurality of external speakers; and a controller configured to establish a role of each of the plurality of external speakers and transmit an audio signal to each of the plurality of external speakers according to the established role.

The controller is configured to establish the role of each of the plurality of external speakers based on at least one of a location, a sound pressure, and a reproduction band of each of the plurality of external speakers.

The controller is configured to establish the role of each of the plurality of external speakers based on distance information between the display device and the external speaker and direction information of the external speaker.

The controller is configured to obtain a Bluetooth signal strength of each of the plurality of external speakers, and obtain distance information between the display device and the external speaker based on the Bluetooth signal strength.

The controller is configured to obtain direction information of the external speaker using at least one of AOA (Angle of Arrival) and AOD (Angle of Departure).

The display device further comprises a user input interface configured to receive a signal from a remote control device, wherein the controller is configured to detect a location of the remote control device and recognize the location of the remote control device as a user's viewing location.

The controller is configured to obtain location information of each of the plurality of external speakers, and recognize an average position of a plurality of pieces of location information corresponding to the plurality of external speakers as a user's viewing location.

The controller is configured to obtain a user's viewing location and correct an audio signal to be transmitted to each of the plurality of external speakers based on the user's viewing location.

The controller is configured to determine a multi-channel type based on at least one of a number and a reproduction band of the plurality of external speakers connected through the wireless communication interface.

The controller is configured to establish an audio channel for each of the plurality of external speakers according to the multi-channel type.

The controller is configured to up-mix an input audio signal according to the multi-channel type.

The controller is configured to determine one of 3.1ch, 5.1ch, 5.1.2ch, 7.1.4ch, 9.1.2ch, 9.1.4ch, 11.1ch, and 22.2ch as the multi-channel type.

The controller is configured to control the display to display a guide for guiding a speaker arrangement according to the determined multi-channel type.

The controller is configured to control the display to display a guide including at least one of a current location of each of the plurality of external speakers, a recommended speaker location, and a location change guide icon.

The controller is configured to obtain a reproduction band of each of the plurality of speakers by recognizing test sound output from the plurality of external speakers.

Advantageous Effects

According to an embodiment of the present disclosure, it is possible to easily implement an optimal multi-channel stereophonic sound system since an audio channel of each of the plurality of external speakers is automatically established when the plurality of external speakers are connected.

In addition, since the optimal position of each of the plurality of external speakers is suggested and the audio signal is corrected based on the location of each of the plurality of external speakers, the user can easily set up a multi-channel stereophonic sound system even without background knowledge about multi-channel audio. That is, when an external speaker is additionally connected, there is an advantage in that the effort and time of a user consumed to set up the installation location, volume, or the like of the external speaker are reduced.

MODE FOR INVENTION

Hereinafter, embodiments relating to the present disclosure will be described in detail with reference to the accompanying drawings. The suffixes "module" and "interface" for components used in the description below are assigned or mixed in consideration of easiness in writing the specification and do not have distinctive meanings or roles by themselves.

Figure 1:
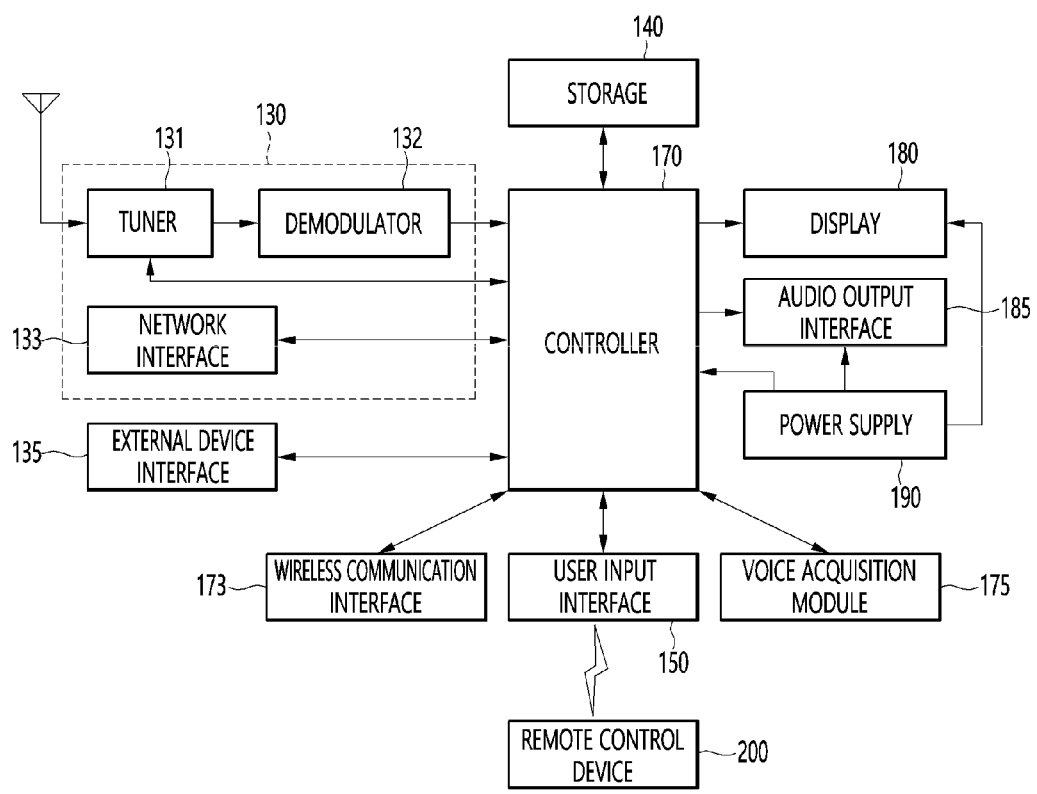
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 can include a broadcast reception module 130, an external device interface 135, a storage 140, a user input interface 150, a controller 170, a wireless communication interface 173, a voice acquisition module 175, a display 180, an audio output interface 185, and a power supply 190.

The broadcast reception module 130 can include a tuner 131, a demodulator 132, and a network interface 133.

The tuner 131 can select a specific broadcast channel according to a channel selection command. The tuner 131 can receive broadcast signals for the selected specific broadcast channel.

The demodulator 132 can divide the received broadcast signals into video signals, audio signals, and broadcast program related data signals and restore the divided video signals, audio signals, and data signals to an output available form.

The network interface 133 can provide an interface for connecting the display device 100 to a wired/wireless network including internet network. The network interface 133 can transmit or receive data to or from another user or another electronic device through an accessed network or another network linked to the accessed network.

The network interface 133 can access a predetermined webpage through an accessed network or another network linked to the accessed network. That is, it can transmit or receive data to or from a corresponding server by accessing a predetermined webpage through network.

Then, the network interface 133 can receive contents or data provided from a content provider or a network operator. That is, the network interface 133 can receive contents such as movies, advertisements, games, VODs, and broadcast signals, which are provided from a content provider or a network provider, through network and information relating thereto.

Additionally, the network interface 133 can receive firmware update information and update files provided from a network operator and transmit data to an internet or content provider or a network operator.

The network interface 133 can select and receive a desired application among applications open to the air, through network.

The external device interface 135 can receive an application or an application list in an adjacent external device and deliver it to the controller 170 or the storage 140.

The external device interface 135 can provide a connection path between the display device 100 and an external device. The external device interface 135 can receive at least one of image and audio outputted from an external device that is wirelessly or wiredly connected to the display device 100 and deliver it to the controller. The external device interface 135 can include a plurality of external input terminals. The plurality of external input terminals can include an RGB terminal, at least one High Definition Multimedia Interface (HDMI) terminal, and a component terminal.

An image signal of an external device inputted through the external device interface 135 can be outputted through the display 180. A sound signal of an external device inputted through the external device interface 135 can be outputted through the audio output interface 185.

An external device connectable to the external device interface 135 can be one of a set-top box, a Blu-ray player, a DVD player, a game console, a sound bar, a smartphone, a PC, a USB Memory, and a home theater system but this is just exemplary.

Additionally, some content data stored in the display device 100 can be transmitted to a user or an electronic device, which is selected from other users or other electronic devices pre-registered in the display device 100.

The storage 140 can store signal-processed image, voice, or data signals stored by a program in order for each signal processing and control in the controller 170.

Additionally, the storage 140 can perform a function for temporarily store image, voice, or data signals outputted from the external device interface 135 or the network interface 133 and can store information on a predetermined image through a channel memory function.

The storage 140 can store an application or an application list inputted from the external device interface 135 or the network interface 133.

The display device 100 can play content files (for example, video files, still image files, music files, document files, application files, and so on) stored in the storage 140 and provide them to a user.

The user input interface 150 can deliver signals inputted from a user to the controller 170 or deliver signals from the controller 170 to a user. For example, the user input interface 150 can receive or process control signals such as power on/off, channel selection, and screen setting from the remote control device 200 or transmit control signals from the controller 170 to the remote control device 200 according to various communication methods such as Bluetooth, Ultra Wideband (WB), ZigBee, Radio Frequency (RF), and IR.

Additionally, the user input interface 150 can deliver, to the controller 170, control signals inputted from local keys (not shown) such as a power key, a channel key, a volume key, and a setting key.

Image signals that are image-processed in the controller 170 can be inputted to the display 180 and displayed as an image corresponding to corresponding image signals. Additionally, image signals that are image-processed in the controller 170 can be inputted to an external output device through the external device interface 135.

Voice signals processed in the controller 170 can be outputted to the audio output interface 185. Additionally, voice signals processed in the controller 170 can be inputted to an external output device through the external device interface 135.

Besides that, the controller 170 can control overall operations in the display device 100.

Additionally, the controller 170 can control the display device 100 by a user command or internal program inputted through the user input interface 150 and download a desired application or application list into the display device 100 in access to network.

The controller 170 can output channel information selected by a user together with processed image or voice signals through the display 180 or the audio output interface 185.

Additionally, according to an external device image playback command received through the user input interface 150, the controller 170 can output image signals or voice signals of an external device such as a camera or a camcorder, which are inputted through the external device interface 135, through the display 180 or the audio output interface 185.

Moreover, the controller 170 can control the display 180 to display images and control broadcast images inputted through the tuner 131, external input images inputted through the external device interface 135, images inputted through the network interface, or images stored in the storage 140 to be displayed on the display 180. In this case, an image displayed on the display 180 can be a still image or video and also can be a 2D image or a 3D image.

Additionally, the controller 170 can play content stored in the display device 100, received broadcast content, and external input content inputted from the outside, and the content can be in various formats such as broadcast images, external input images, audio files, still images, accessed web screens, and document files.

Moreover, the wireless communication interface 173 can perform a wired or wireless communication with an external electronic device. The wireless communication interface 173 can perform short-range communication with an external device. For this, the wireless communication interface 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication interface 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication interface 173 can detect (or recognize) a communicable wearable device around the display device 100. Furthermore, if the detected wearable device is a device authenticated to communicate with the display device 100, the controller 170 can transmit at least part of data processed in the display device 100 to the wearable device through the wireless communication interface 173. Accordingly, a user of the wearable device can use the data processed in the display device 100 through the wearable device.

The voice acquisition module 175 can acquire audio. The voice acquisition module 175 may include at least one microphone (not shown), and can acquire audio around the display device 100 through the microphone (not shown).

The display 180 can convert image signals, data signals, or OSD signals, which are processed in the controller 170, or images signals or data signals, which are received in the external device interface 135, into R, G, and B signals to generate driving signals.

Furthermore, the display device 100 shown in FIG. 1 is just one embodiment of the present disclosure and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present disclosure and its specific operation or device does not limit the scope of the present disclosure.

According to another embodiment of the present disclosure, unlike FIG. 1, the display device 100 can receive images through the network interface 133 or the external device interface 135 and play them without including the tuner 131 and the demodulator 132.

For example, the display device 100 can be divided into an image processing device such as a set-top box for receiving broadcast signals or contents according to various network services and a content playback device for playing contents inputted from the image processing device.

In this case, an operating method of a display device according to an embodiment of the present disclosure described below can be performed by one of the display device described with reference to FIG. 1, an image processing device such as the separated set-top box, and a content playback device including the display 180 and the audio output interface 185.

The audio output interface 185 receives the audio processed signal from the controller 170 and outputs the sound.

The power supply 190 supplies the corresponding power throughout the display device 100. In particular, the power supply 190 supplies power to the controller 170 that can be implemented in the form of a System On Chip (SOC), a display 180 for displaying an image, and the audio output interface 185 for outputting audio or the like.

Specifically, the power supply 190 may include a converter for converting an AC power source into a DC power source, and a DC/DC converter for converting a level of the DC source power.

Figure 2:
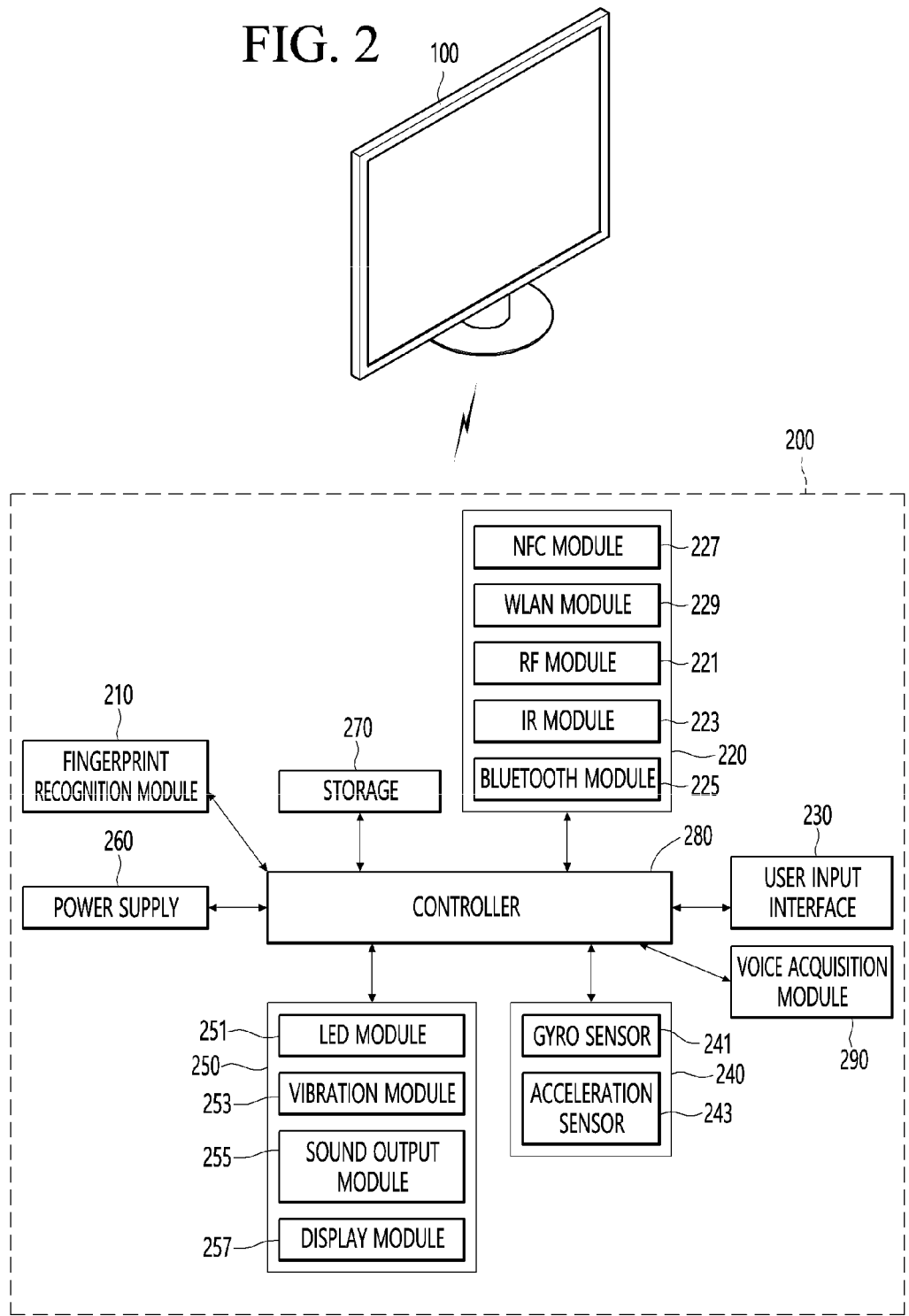
FIG. 2 is a block diagram illustrating a remote control device according to an embodiment of the present disclosure.
Figure 3:
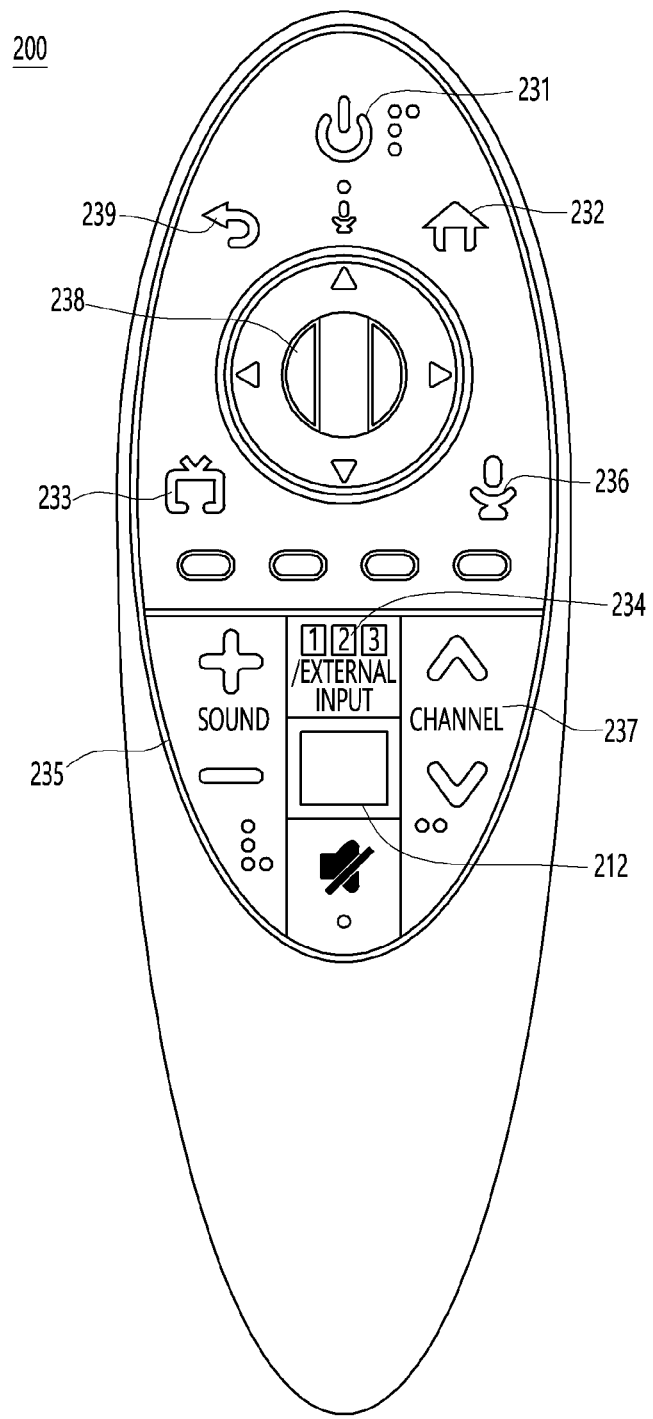
FIG. 3 is a view illustrating an actual configuration of a remote control device according to an embodiment of the present disclosure.

Then, referring to FIGS. 2 and 3, a remote control device is described according to an embodiment of the present disclosure.

FIG. 2 is a block diagram illustrating a remote control device according to an embodiment of the present disclosure and FIG. 3 is a view illustrating an actual configuration of a remote control device according to an embodiment of the present disclosure.

First, referring to FIG. 2, a remote control device 200 can include a fingerprint recognition module 210, a wireless communication interface 220, a user input interface 230, a sensor 240, an output interface 250, a power supply 260, a storage 270, a controller 280, and a voice acquisition module 290.

Referring to FIG. 2, the wireless communication interface 220 transmits/receives signals to/from an arbitrary any one of display devices according to the above-mentioned embodiments of the present disclosure.

The remote control device 200 can include an RF module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include an NFC module 227 for transmitting/receiving signals to/from the display device 100 according to the Near Field Communication (NFC) communication standards and a WLAN module 229 for transmitting/receiving signals to/from the display device 100 according to the Wireless LAN (WLAN) communication standards Additionally, the remote control device 200 can transmit signals containing information on a movement of the remote control device 200 to the display device 100 through the wireless communication interface 220.

Moreover, the remote control device 200 can receive signals transmitted from the display device 100 through the RF module 221 and if necessary, can transmit a command on power on/off, channel change, and volume change to the display device 100 through the IR module 223.

The user input interface 230 can be configured with a keypad button, a touch pad, or a touch screen. A user can manipulate the user input interface 230 to input a command relating to the display device 100 to the remote control device 200. If the user input interface 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present disclosure, the fingerprint recognition button 212 can perform a push operation and receive a push operation and a fingerprint recognition operation. The power button 231 can be button for turning on/off the power of the display device 100. The power button 231 can be button for moving to the home screen of the display device 100. The live button 233 can be a button for displaying live broadcast programs. The external input button 234 can be button for receiving an external input connected to the display device 100. The voice adjustment button 235 can be button for adjusting the size of a volume outputted from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

Again, FIG. 2 is described.

If the user input interface 230 includes a touch screen, a user can touch a soft key of the touch screen to input a command relating to the display device 100 to the remote control device 200. Additionally, the user input interface 230 can include various kinds of input means manipulated by a user, for example, a scroll key and a jog key, and this embodiment does not limit the scope of the present disclosure.

The sensor 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display 180 of the display device 100.

The output interface 250 can output image or voice signals corresponding to a manipulation of the user input interface 230 or corresponding to signals transmitted from the display device 100. A user can recognize whether the user input interface 230 is manipulated or the display device 100 is controlled through the output interface 250.

For example, the output interface 250 can include an LED module 251 for flashing, a vibration module 253 for generating vibration, a sound output module 255 for outputting sound, or a display module 257 for outputting an image, if the user input interface 230 is manipulated or signals are transmitted/received to/from the display device 100 through the wireless communication interface 220.

Additionally, the power supply 260 supplies power to the remote control device 200 and if the remote control device 200 does not move for a predetermined time, stops the power supply, so that power waste can be reduced. The power supply 260 can resume the power supply if a predetermined key provided at the remote control device 200 is manipulated.

The storage 270 can store various kinds of programs and application data necessary for a control or operation of the remote control device 200. If the remote control device 200 transmits/receives signals wirelessly through the display device 100 and the RF module 221, the remote control device 200 and the display device 100 transmits/receives signals through a predetermined frequency band.

The controller 280 of the remote control device 200 can store, in the storage 270, information on a frequency band for transmitting/receiving signals to/from the display device 100 paired with the remote control device 200 and refer to it.

The controller 280 controls general matters relating to a control of the remote control device 200. The controller 280 can transmit a signal corresponding to a predetermined key manipulation of the user input interface 230 or a signal corresponding to a movement of the remote control device 200 sensed by the sensor 240 to the display device 100 through the wireless communication interface 220.

Additionally, the voice acquisition module 290 of the remote control device 200 can obtain voice.

The voice acquisition module 290 can include at least one microphone 291 and obtain voice through the microphone 291.

Figure 4:
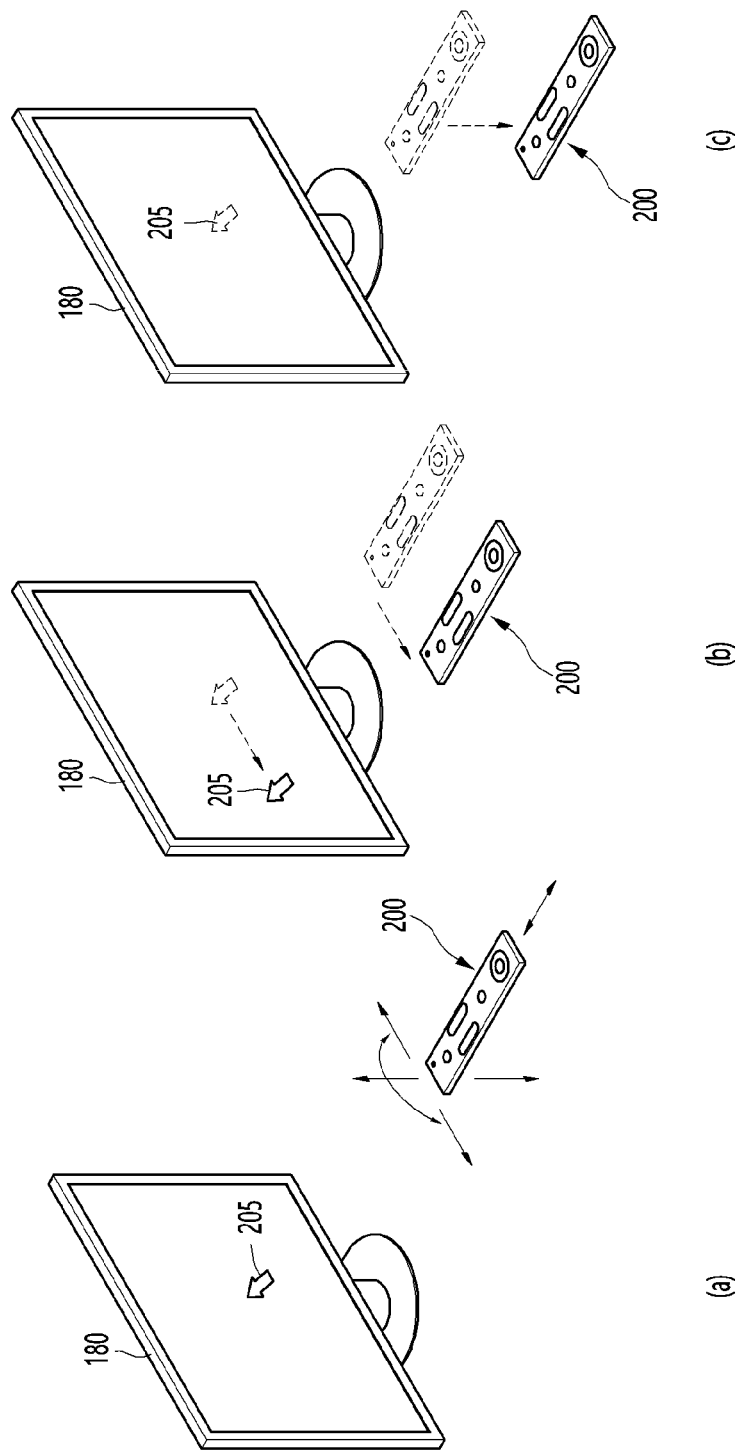
FIG. 4 is a view of utilizing a remote control device according to an embodiment of the present disclosure.

Then, FIG. 4 is described.

FIG. 4 is a view of utilizing a remote control device according to an embodiment of the present disclosure.

FIG. 4A illustrates that a pointer 205 corresponding to the remote control device 200 is displayed on the display 180.

A user can move or rotate the remote control device 200 vertically or horizontally. The pointer 205 displayed on the display 180 of the display device 100 corresponds to a movement of the remote control device 200. Since the corresponding pointer 205 is moved and displayed according to a movement on a 3D space as show in the drawing, the remote control device 200 can be referred to as a spatial remote controller.

FIG. 4B illustrates that if a user moves the remote control device 200, the pointer 205 displayed on the display 180 of the display device 100 is moved to the left in correspondence thereto.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4C illustrates that while a specific button in the remote control device 200 is pressed, a user moves the remote control device 200 away from the display 180. Thus, a selection area in the display 180 corresponding to the pointer 205 can be zoomed in and displayed largely.

On the other hand, if a user moves the remote control device 200 close to the display 180, a selection area in the display 180 corresponding to the pointer 205 can be zoomed out and displayed reduced.

On the other hand, if the remote control device 200 is away from the display 180, a selection area can be zoomed out and if the remote control device 200 is close to the display 180, a selection area can be zoomed in.

Additionally, if a specific button in the remote control device 200 is pressed, the recognition of a vertical or horizontal movement can be excluded. That is, if the remote control device 200 is moved away from or close to the display 180, the up, down, left, or right movement can not be recognized and only the back and fourth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display 180 in correspondence to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display 180 and also can be displayed in correspondence to a plurality of points such as a line and a surface.

The display device 100 according to an embodiment of the present disclosure may be connected to at least one external speaker through the wireless communication interface 173.

For example, the wireless communication interface 173 may be connected to an external speaker through Bluetooth. However, Bluetooth is only given as an example for convenience of description, and there are various wireless communication technologies for connecting the display device 100 and an external speaker. Also, the display device 100 may be connected to an external speaker in a wired manner.

When the wireless communication interface 173 is connected to a plurality of external speakers, the controller 170 may establish a role of each of the plurality of external speakers.

Specifically, when the display device 100 provides multi-channel audio through the audio output interface 185 and the external speaker, the audio output interface 185 and the external speaker may output different sounds. For example, when the display device 100 provides 5.1-channel audio, the audio output interface 185 may output sounds corresponding to the front left, center, and front right, respectively, a first external speaker may output sound corresponding to the rear left, and second external speaker may output a sound corresponding to the rear right. To this end, the controller 170 may establish the role of the first external speaker to the rear left and the role of the second external speaker to the rear right.

In the present disclosure, the role of the speaker may indicate the type of sound output by each speaker. That is, the role of the speaker may mean a channel that each speaker is responsible for.

The role of the speaker may vary depending on the type of multi-channel.

For example, when the multi-channel is 5.1-channel, the role of the speaker may be center, front left, front right, rear left, rear right, or bass.

The controller 170 may establish a speaker role for each of the plurality of external speakers, and transmit an audio signal to each of the plurality of external speakers according to the established role.

Figure 5:
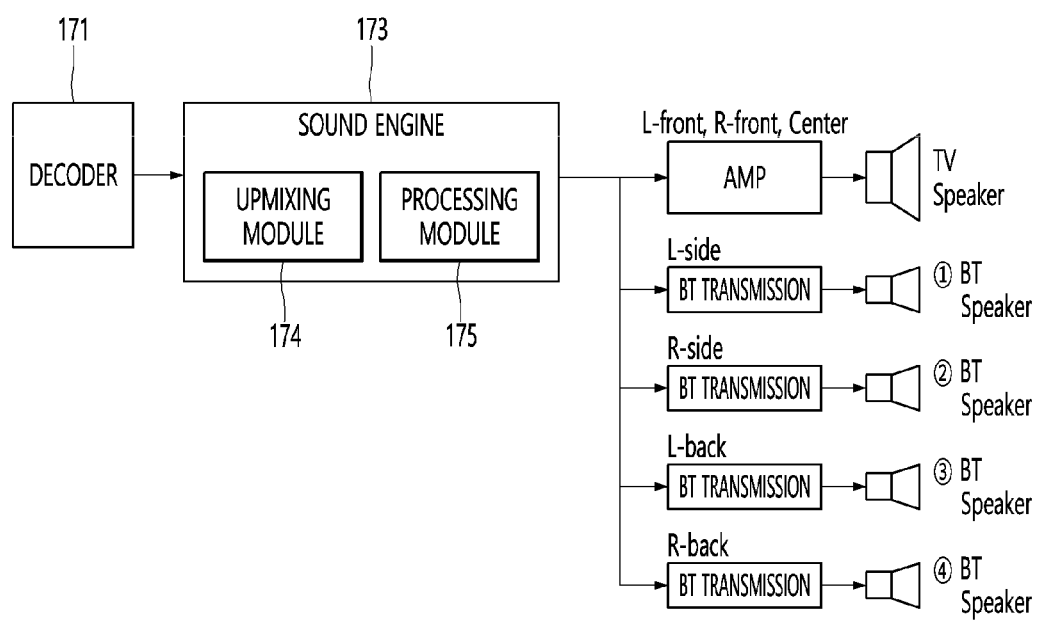
FIG. 5 is a block diagram illustrating a method for transmitting an audio signal according to a speaker role in a display device according to an embodiment of the present disclosure.

FIG. 5 is a block diagram illustrating a method for transmitting an audio signal according to a speaker role in a display device according to an embodiment of the present disclosure.

The controller 170 may include a decoder 171 and a sound engine module 173.

The decoder 171 may decode an input audio signal.

The sound engine module 173 may receive the decoded audio signal and process the audio signal according to sound to be output from a speaker.

The sound engine module 173 may process the decoded audio signal by upmixing or bypassing.

The sound engine module 173 may include at least one of an up-mixing module 174 and a processing module 175.

The up-mixing module 174 may expand the number of channels of the input audio signal. The controller 170 may determine a multi-channel type based on the number of external speakers. When the number of channels according to the determined multi-channel type is greater than the number of channels of the input audio signal, the controller 170 may control the up-mixing module 174 to expand the number of channels of the input audio signal.

The processing module 175 may process the up-mixed audio signal according to the sound output from the audio output interface 185 or an external speaker. The processing module 175 may be a Post Processing Module.

The processing module 175 may perform signal processing on bypassed audio.

The sound engine module 173 may transmit the signal-processed audio signal to the audio output interface 185 and an external speaker (BT Speaker).

The audio output interface 185 is for outputting sound from the display device 100 itself, and may include an amplifier AMP and an internal speaker.

The external speaker may be a Bluetooth-connected speaker, and sound may be transmitted via Bluetooth (BT) through the wireless communication interface 173.

As an example, the sound engine module 173 may map a front left (L-front) channel, a front right (R-front) channel, and a center channel to the audio output interface 185, a left side (L-side) channel to a first external speaker, a right side (R-side) channel to a second external speaker, a rear left (L-back) channel to a third external speaker, and a rear right (R-back) channel to a fourth external speaker and then transmit, to the mapped channels, audio signals respectively corresponding to the channels.

The controller 170 may map a channel to each of the external speakers based on the numbers, types, locations, and the like of the external speakers connected to the display device 100.

Next, a method of guiding an optimal location for each external speaker connected to a display device, mapping a channel to the external speaker, and correcting an audio signal according to an embodiment of the present disclosure will be described in detail.

Figure 6:
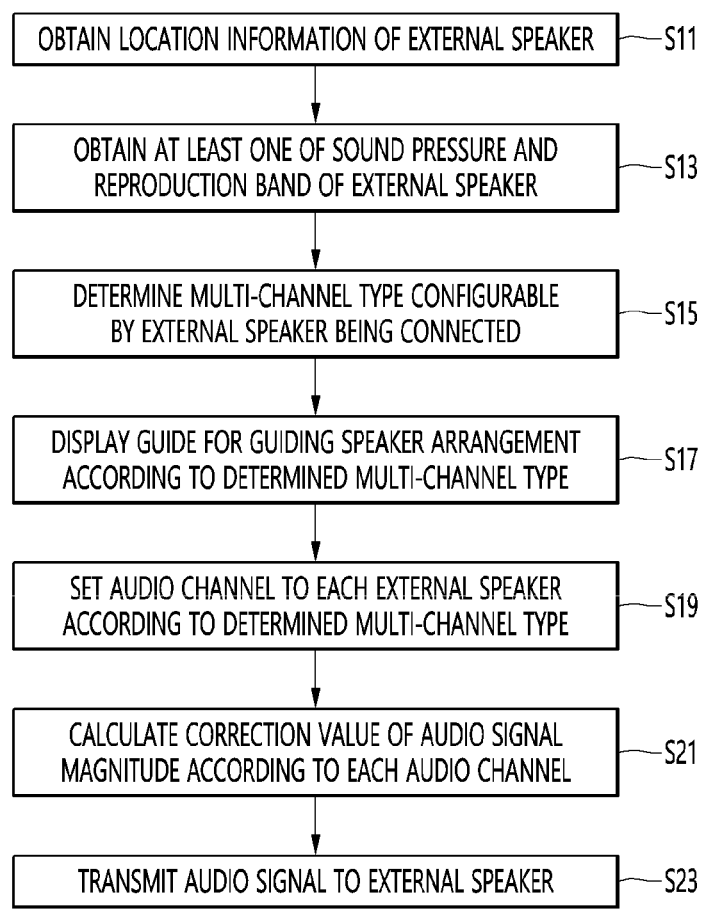
FIG. 6 is a flowchart illustrating a method of operating a display device according to an embodiment of the present disclosure.

FIG. 6 is a flowchart illustrating a method of operating a display device according to an embodiment of the present disclosure.

The controller 170 may obtain location information of external speakers (S11).

The location information of the external speakers may refer to distance information to the external speakers and direction information of the external speakers.

After obtaining the distance information to the external speakers and the direction information of the external speakers, the controller 170 may obtain location information of each of the external speakers based on the distance information and the direction information.

First, a method of obtaining distance information will be described.

The controller 170 may obtain the strength of a wireless communication signal of each of the plurality of external speakers, and obtain distance information to each of the external speakers based on the strength of the wireless communication signal. For example, the controller 170 may obtain a Bluetooth signal strength of each of the plurality of external speakers, and obtain distance information between the display device and the external speaker based on the Bluetooth signal strength.

The controller 170 may calculate a distance to the external speaker to be closer as the strength of the wireless communication signal is stronger, and calculate a distance to the external speaker to be farther as the strength of the wireless communication signal is weaker.

An algorithm for calculating distance information based on the strength of a wireless communication signal may be stored in advance. For example, an algorithm for calculating distance information based on the strength of a wireless communication signal may be based on Received Signal Strength Indication (RSSI).

Next, a method for obtaining direction information will be described.

The controller 170 may obtain direction information of the external speaker using at least one of an angle of arrival (AOA) and an angle of departure (AOD).

Figure 7:
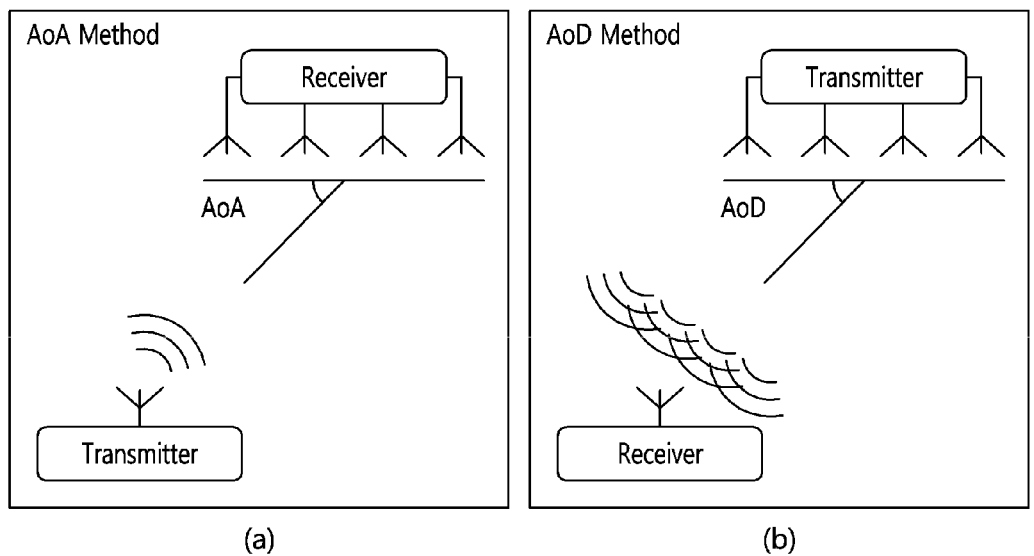
FIG. 7 is a diagram for describing a method for obtaining direction information of an external speaker in a display apparatus according to an embodiment of the present disclosure.

FIG. 7 is a diagram for describing a method for obtaining direction information of an external speaker in a display apparatus according to an embodiment of the present disclosure.

In FIG. 7, (a) is for describing the Angle of Arrival (AoA) method, where AoA may represent a value obtained by measuring a direction in which a main portion of a signal originates with reference to a horizontal line when the signal arrives at a reception antenna. In order to use the AoA method, multiple antennas may be required in the same device to measure the signal. According to the AoA method, the transmitter may be found with an accuracy of about 10 to 20 centimeters (cm).

In FIG. 7, (b) is for describing an Angle of Departure (AoD) method, where AoD may represent a measured value when signals transmitted in various angles arrives at a reception antenna.

The controller 170 may obtain a direction, that is, an angle, in which the external speaker is located with respect to the display device 100 by measuring an angle of arrival (AOA) or an angle of departure (AOD).

On the other hand, the controller 170 may obtain direction information of the external speaker through another algorithm without limiting to the AOA (Angle of Arrival) and the AOD (Angle of Departure).

The distance information and direction information to the external speaker obtained as described above may be a distance and a direction calculated based on the display device 100 or the remote control device 200.

According to an embodiment, the controller 170 may obtain the distance information and the direction information to the external speaker based on the remote control device 200. That is, the controller 170 may obtain the location information of the external speaker by obtaining the distance and direction to each external speaker through the voice acquisition module 290 provided in the remote control device 200.

The controller 170 may detect a location of the remote control device 200 and recognize the location of the remote control device 200 as the user's viewing location.

In this case, the user may automatically establish a stereoscopic sound system according to a method to be described later after positioning the remote control device 200 at a position where the user usually views the display device 100, thus making it easy to establish the stereophonic sound system optimized for the user's viewing position.

According to another embodiment, the controller 170 may obtain the distance information and the direction information to the external speaker based on the display device 200. That is, the controller 170 may obtain the location information of the external speaker by obtaining the distance and direction to each external speaker through the voice acquisition module 290.

The controller 170 may recognize an average position of a plurality of pieces of location information corresponding to a plurality of external speakers as the user's viewing location. For example, when the location information (X1, Y1) of the first external speaker, the location information (X2, Y2) of the second external speaker, the location information (X3, Y3) of the third external speaker, and the location information (X4, Y4) of the fourth external speaker are obtained, the controller 170 may obtain ((X1+X2+X3+X4)/4, (Y1+Y2+Y3+Y4)/4) as a user's viewing location.

In this case, there is an advantage that the stereophonic sound system can be established more easily without the remote control device 200.

Again, details will be described with reference to FIG. 6.

The controller 170 may obtain at least one of a sound pressure and a reproduction band of the external speaker (S13).

The controller 170 may obtain at least one of the sound pressure and the reproduction band of the external speaker in order to automatically establish the optimal stereophonic sound system regardless of the type of the external speaker.

The speakers may be classified into a subwoofer and a satellite according to the sound range of output sound.

Figure 8:
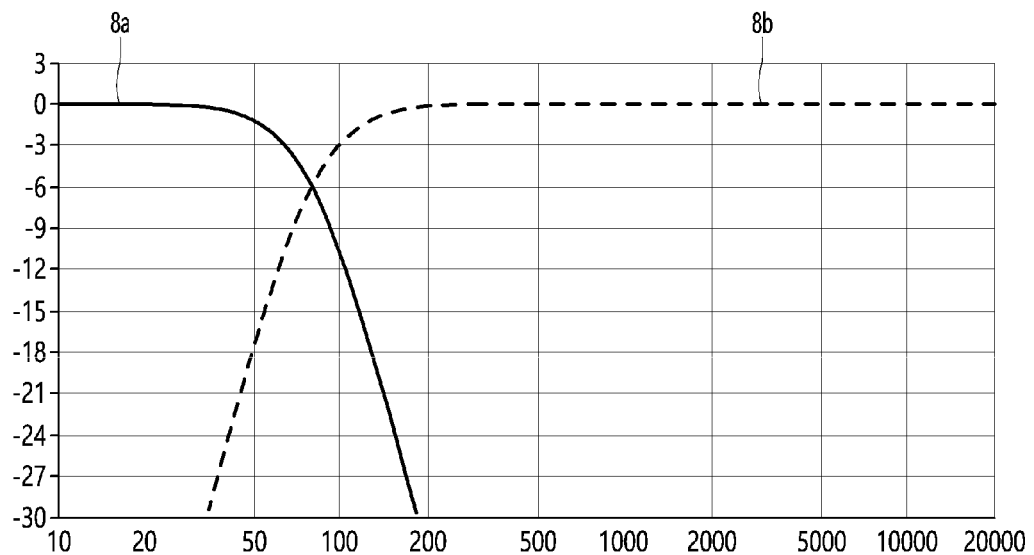
FIG. 8 is an exemplary view for describing a method for obtaining at least one of a sound pressure and a play band of an external speaker in a display device according to an embodiment of the present disclosure.

FIG. 8 is an exemplary view for describing a method for obtaining at least one of a sound pressure and a play band of an external speaker in a display device according to an embodiment of the present disclosure.

Referring to FIG. 8, the reproduction band of the subwoofer is about 10 Hz to 100 Hz, the sound pressure in the reproduction band is about −6 dB to 0 dB, and the reproduction band of the satellite is about 100 Hz to 20000 Hz, and the sound pressure in the reproduction band is about −6 dB to 0 dB.

Meanwhile, the sound pressure and reproduction band of the subwoofer and the satellite shown in FIG. 8 are only exemplary. That is, the subwoofer speaker may have different reproduction bands and sound pressures depending on the structure, material, or the like thereof even though the same subwoofer speaker. Similarly, the satellite speaker may have different reproduction bands and sound pressures depending on the structure, material, or the like thereof even though the same satellite speaker.

According to an embodiment, the controller 170 may receive information on the external speaker when the external speaker is connected, and the information on the external speaker may include sound pressure and the reproduction band of the external speaker.

According to another embodiment, the controller 170 may control the external speaker such that the external speaker outputs test sound and the voice acquisition module 290 of the remote control device 200 or the voice acquisition module 190 of the display device 100 may obtain the test sound output from the external speaker and obtain a sound pressure and a reproduction band of each of the external speakers by analyzing the obtained test sound.

That is, the controller 170 may obtain a reproduction band of each of a plurality of speakers by recognizing test sound output from the plurality of external speakers.

Again, details will be described with reference to FIG. 6.

The controller 170 may determine types of multiple channels which may be configured by the connected external speaker (S15).

The controller 170 may obtain the number of external speakers currently connected to the display device 100 and the types of the external speakers.

The controller 170 may obtain the types of multiple channels configurable by the external speakers being connected based on the number and types of external speakers being connected.

To this end, the storage 140 may store data on the configuration and arrangement of speakers for multiple channels.

Figure 9A:
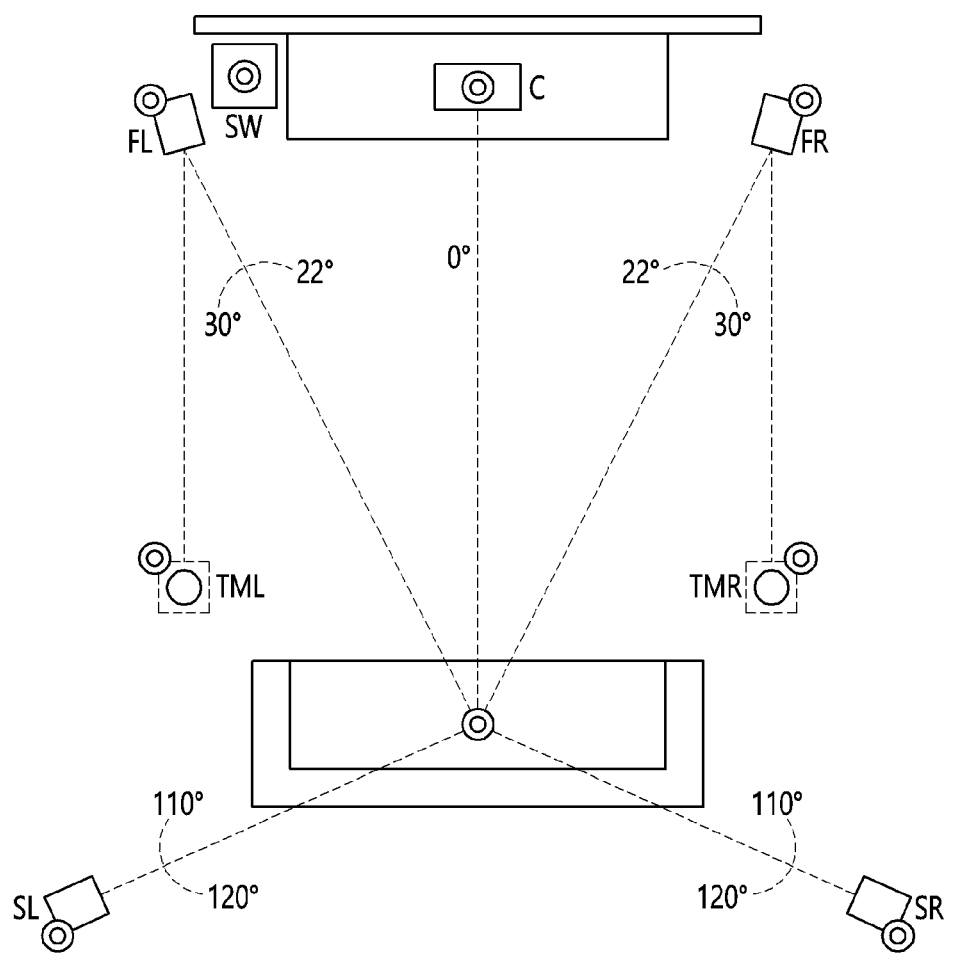
FIGS. 9A to 9C are exemplary views for describing data for each type of multi-channel stored in a display device according to an embodiment of the present disclosure.
Figure 9B:
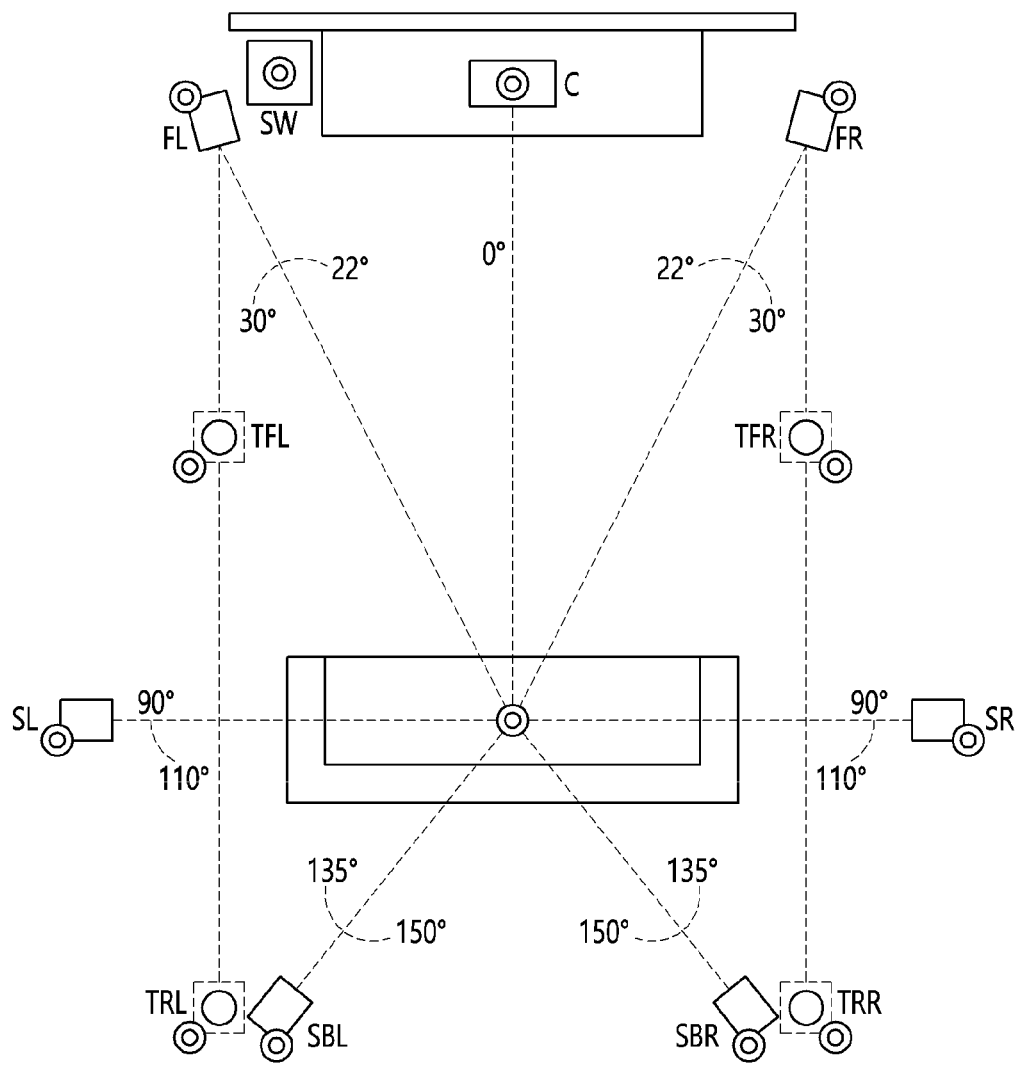
Figure 9C:
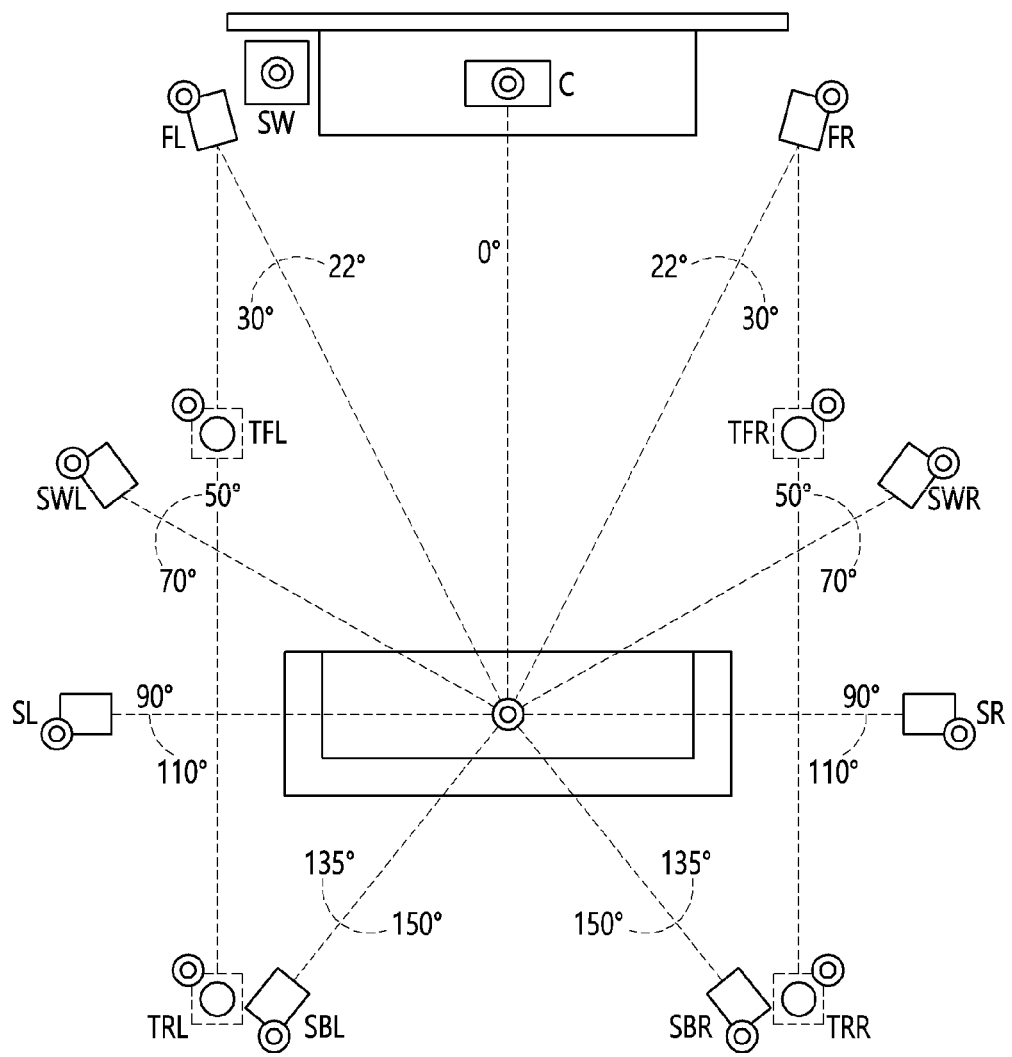

FIGS. 9A to 9C are exemplary views for describing data for each type of multi-channel stored in a display device according to an embodiment of the present disclosure.

FIG. 9A may show a speaker configuration and arrangement for 5.1.2 channels. The storage 140 may store, as 5.1.2 channel data, location information of a front left (FL) speaker, a front right (FR) speaker, a center (C) speaker, a surround left (SL) speaker, a surround right (SR) speaker, a subwoofer (SW) speaker, a top middle left (TML) speaker and a top middle right (TMR) speaker arranged as shown in FIG. 9A. The location information of the speakers may include distance information and angle information to each speaker based on a user's viewing location. In this case, the user's viewing position may be the above-described position of the remote control device 200 or average position information of external speakers.

FIG. 9B may show a speaker configuration and arrangement of 7.1.4 channels. The storage 140 may store, as 5.1.2 channel data, location information of a front left (FL) speaker, a front right (FR) speaker, a center (C) speaker, a surround left (SL) speaker, a surround right (SR) speaker, a surround back left (SBL) speaker, a surround back right (SBR) speaker, a subwoofer (SW) speaker, a top front left (TFL) speaker, a top front right (TFR) speaker, a top rear left (TRL) speaker, a top rear right (TRR) speaker arranged as shown in FIG. 9B. Similarly, the location information of the speakers may include distance information and angle information to each speaker based on a user's viewing location. In this case, the user's viewing position may be the above-described position of the remote control device 200 or average position information of external speakers.

FIG. 9C may show a speaker configuration and arrangement of 9.1.4 channels. The storage 140 may store, as 5.1.2 channel data, location information of a front left (FL) speaker, a front right (FR) speaker, a center (C) speaker, a surround left (SL) speaker, a surround right (SR) speaker, a surround back left (SBL) speaker, a surround back right (SBR) speaker, a surround wide left (SWL) speaker, a surround wide right (SWR) speaker, a subwoofer (SW) speaker, a top front left (TFL) speaker, a top front right (TFR) speaker, a top rear left (TRL) speaker, a top rear right (TRR) speaker arranged as shown in FIG. 9C. Similarly, the location information of the speakers may include distance information and angle information to each speaker based on a user's viewing location. In this case, the user's viewing position may be the above-described position of the remote control device 200 or average position information of external speakers.

Meanwhile, the 5.1.2 channels, the 7.1.4 channels, and the 9.1.4 channels have been only described with reference to FIGS. 9A to 9C, but these are only examples. That is, the storage 140 may store data for each of 3.1ch, 5.1ch, 5.1.2ch, 7.1.4ch, 9.1.2ch, 9.1.4ch, 11.1ch, and 22.2ch. In this case, the controller 170 may determine one of 3.1ch, 5.1ch, 5.1.2ch, 7.1.4ch, 9.1.2ch, 9.1.4ch, 11.1ch, and 22.2ch as a multi-channel type. However, the channels described above are also exemplary only. The multi-channel type may be more diverse.

The controller 170 may determine the multi-channel type based on at least one of the number and the reproduction bands of a plurality of external speakers connected through the wireless communication interface 173.

Specifically, when it is determined that a subwoofer speaker is connected as a result of obtaining the reproduction bands of the external speakers in step S13, the controller 170 may determine a channel having a.1.b channels the multi-channel type.

Also, the controller 170 may obtain the number of external speakers excluding the subwoofer speaker. For example, the controller 170 may obtain the number of the external speakers excluding the subwoofer speaker as "n".

Also, the controller 170 may obtain location information of each of external speakers except for the subwoofer speaker, in particular, the number of speakers installed on the ceiling based on direction information. For example, the controller 170 may obtain the number of the speakers installed on the ceiling as "b". In this case, "a" may be obtained as "n-b".

As a result, the controller 170 may determine the multi-channel type as a.1.b channels. However, the above-described method is merely an example for describing a method of determining the multi-channel type.

The controller 170 may determine the multi-channel type based on at least one of the number, locations, sound pressures, and reproduction bands of the external speakers.

Again, details will be described with reference to FIG. 6.

The controller 170 may display a guide for guiding speaker arrangement according to the determined multi-channel type (S17).

The display 180 may display a guide. Here, the guide may be information for guiding speaker arrangement according to the determined multi-channel type.

The controller 170 may allow the display 180 to display a guide including at least one of a current location of each of a plurality of external speakers, a recommended speaker location, and a location change guide icon.

Next, a method of displaying a guide for guiding speaker arrangement according to a multi-channel type in a display device according to an embodiment of the present disclosure will be described with reference to the examples shown in FIGS. 10 to 13.

Figure 10:
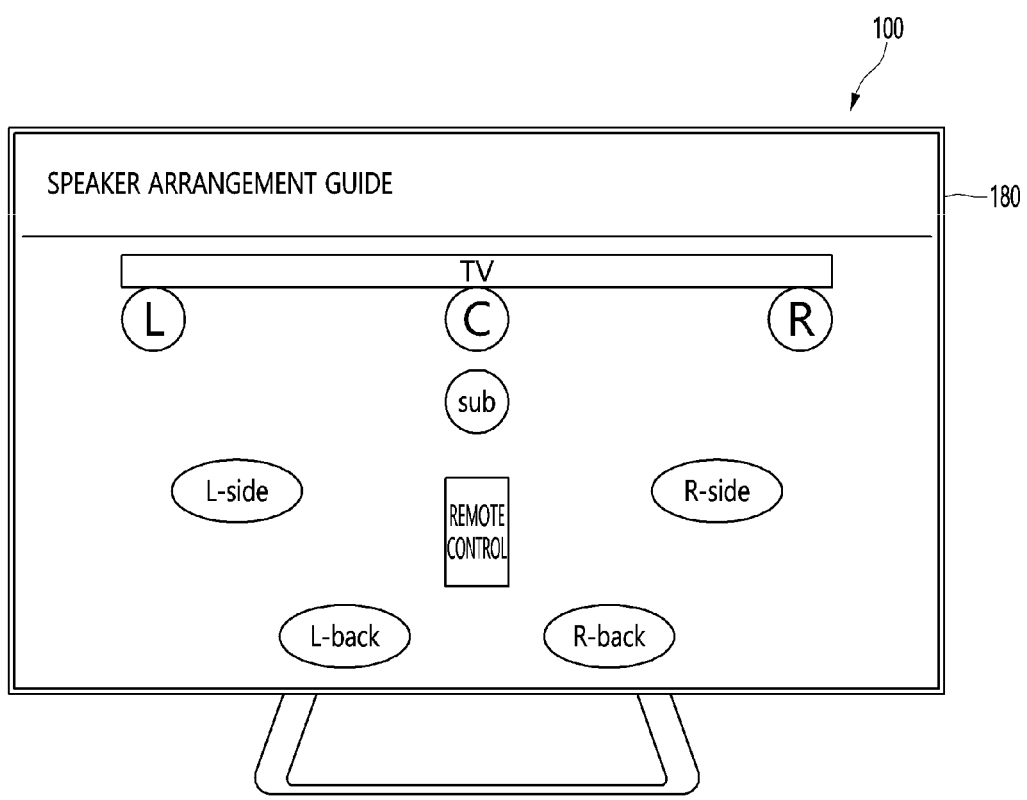
FIG. 10 is an exemplary view of a guide displayed by a display device according to a first embodiment of the present disclosure.

FIG. 10 is an exemplary view of a guide displayed by a display device according to a first embodiment of the present disclosure.

According to the first embodiment of the present disclosure, the display 180 may display a guide including a recommended speaker location.

The recommended speaker location indicates the location of each of the speakers according to the determined multi-channel type, and may include the location of each of external speakers with respect to a user's viewing location (e.g., the location of a remote control device).

Figure 11:
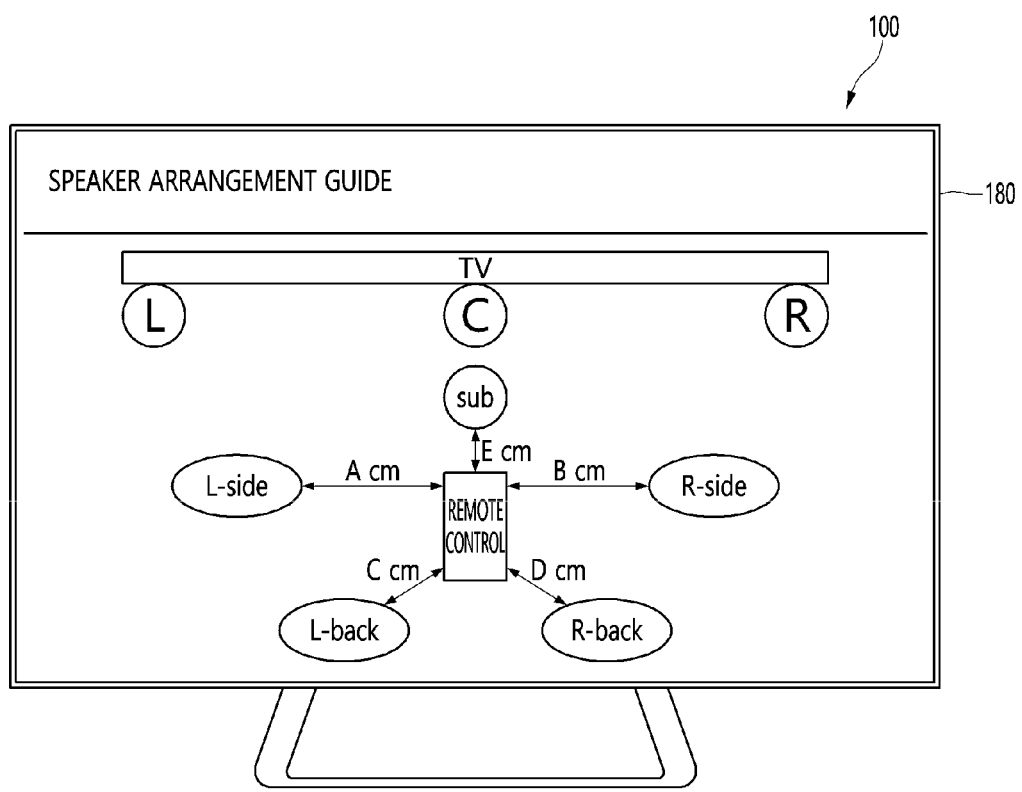
FIG. 11 is an exemplary view of a guide displayed by a display device according to a second embodiment of the present disclosure.

FIG. 11 is an exemplary view of a guide displayed by a display device according to a second embodiment of the present disclosure.

According to the second embodiment of the present disclosure, the display 180 may display a guide including a recommended speaker location.

The recommended speaker location indicates the location of each of the speakers according to the determined multi-channel type, and may include the location of each of external speakers and distance information with respect to a user's viewing location (e.g., the location of a remote control device).

For example, with respect to the user's viewing location, the surround left speaker is placed at a distance of A cm from the viewing location, the surround right speaker is placed at a distance of B cm from the viewing location, and the surround rear left speaker is placed at a distance of C cm from the viewing location, the surround rear right speaker is placed at a distance of D cm from the viewing location, and the subwoofer speaker is polaced at a distance of E cm from the viewing location.

Also, although not shown in FIG. 11, the recommended speaker location may further include angle information from the user's viewing location to each external speaker.

Figure 12:
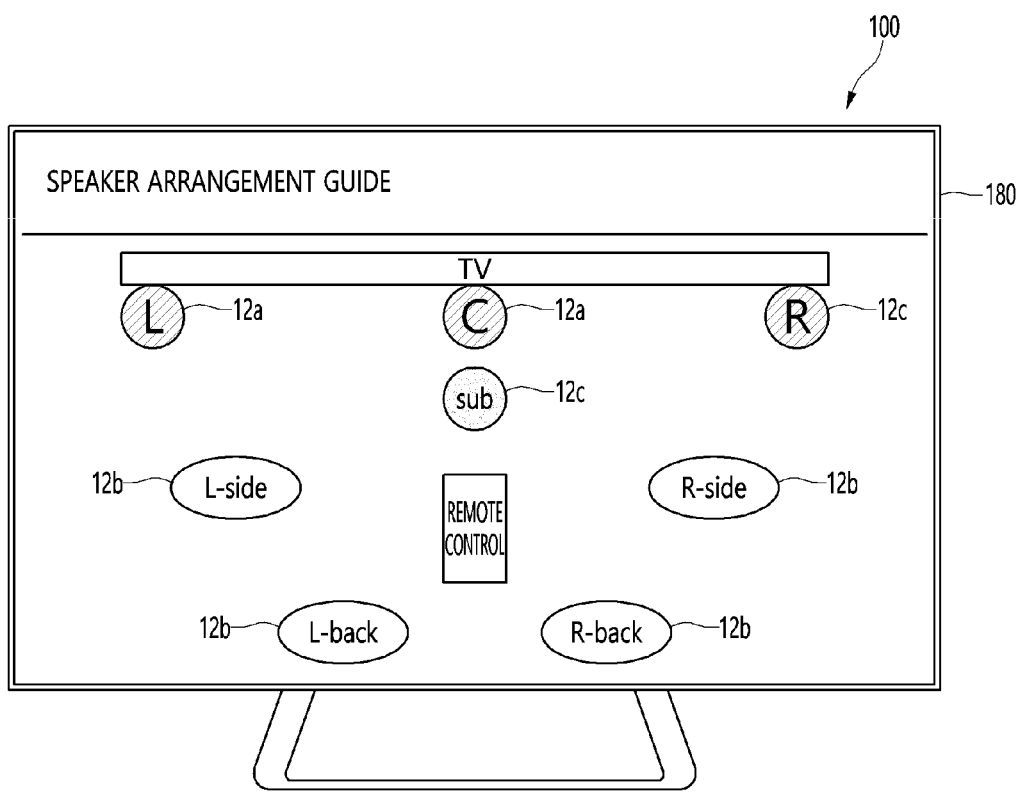
FIG. 12 is an exemplary view of a guide displayed by a display device according to a third embodiment of the present disclosure.

FIG. 12 is an exemplary view of a guide displayed by a display device according to a third embodiment of the present disclosure.

According to the third embodiment of the present disclosure, the display 180 may display a guide including a recommended speaker location, and a speaker icon displayed on the guide may indicate a status of a speaker.

That is, the display 180 may differently display the speaker icon on the guide according to a state of the speaker. Referring to the example of FIG. 12, the controller 170 may display, on the guide, at least one of a first speaker icon 12a indicating an internal speaker of a TV, a second speaker icon 12b indicating a connected external speaker, and a third speaker icon 12c indicating an inactive external speaker.

The first speaker icon 12a may indicate each audio channel output through the audio output interface 185. The second speaker icon 12b may indicate an audio channel output through an external speaker. The third speaker icon 12c may indicate an audio channel not currently connected, but capable of composing a multi-channel when connected.

Figure 14:
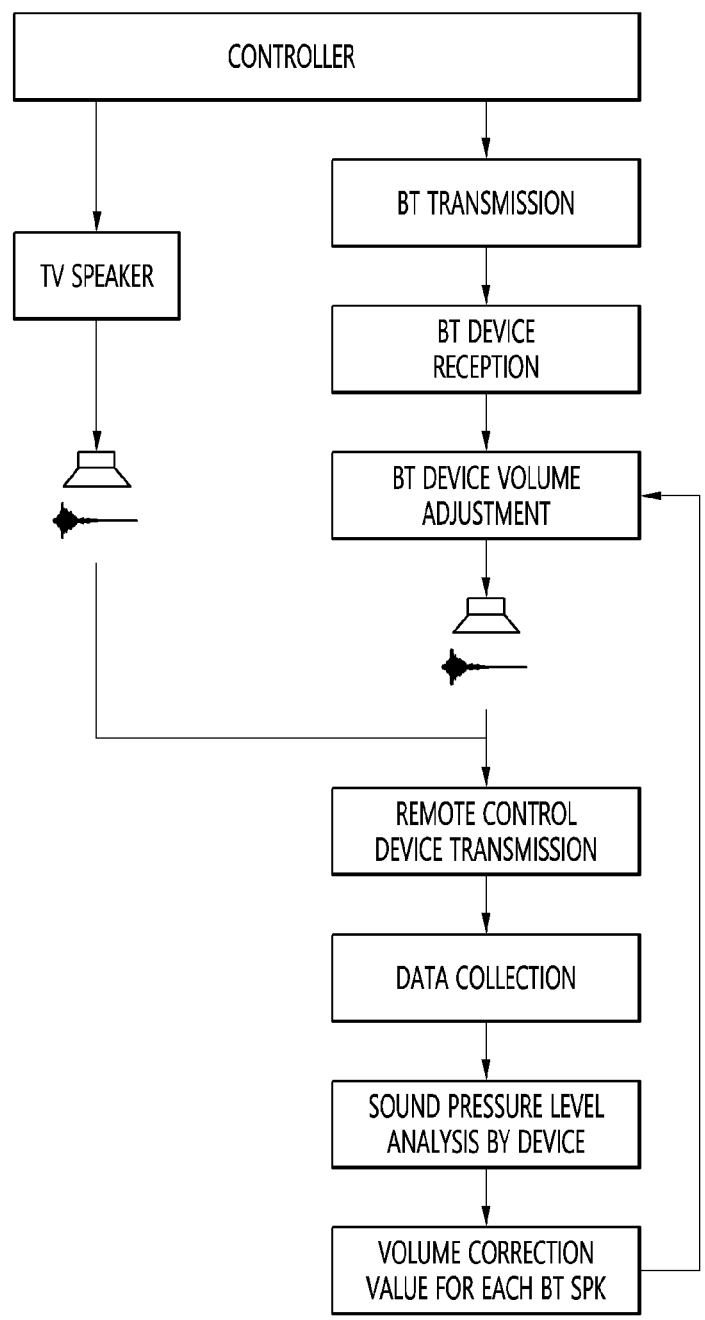
FIG. 14 is a diagram for describing a method of correcting an audio signal in a display device according to an embodiment of the present disclosure.

FIG. 14 is an exemplary view of a guide displayed by a display device according to a fourth embodiment of the present disclosure.

According to the fourth embodiment of the present disclosure, the display 180 may display a guide including a recommended speaker location, and the guide may include a current location of each external speaker, a recommended speaker location, and a location change guide icon.

Figure 13:
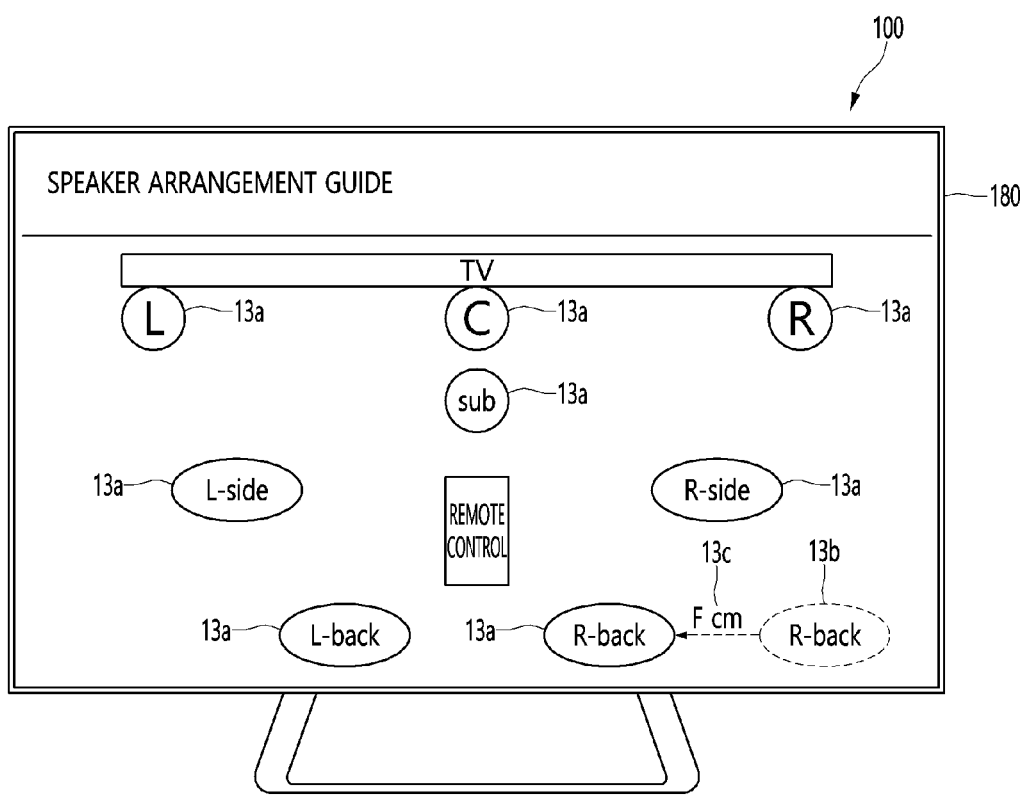
FIG. 13 is an exemplary view of a guide displayed by a display device according to a fourth embodiment of the present disclosure.

According to the example of FIG. 13, the current location of the external speaker may be indicated by a dotted line icon 13b, and the recommended speaker location may be indicated by a solid line icon 13a.

When the current location of the external speaker matches the recommended speaker location, the dotted line icon 13b may not be displayed by the solid line icon 13a. However, when the current location does not match and the recommended speaker location, the controller 170 may control the display 180 such that the display 180 displays the location change icon 13c for providing a guide such that the speaker according to the dotted line icon 13b is to move to the location according to the solid line icon 13a.

The location change icon 13c may include at least one of direction information and distance information for guiding change of a speaker location.

The user can easily set up the optimal stereophonic sound system by changing the speaker position by referring to the dotted line icon 13b, the solid line icon 13a, and the location change icon 13c.

Again, details will be described with reference to FIG. 6.

The controller 170 may establish an audio channel for each of the external speakers according to the determined multi-channel type (S19).

The controller 170 may respectively map audio channels to a plurality of external speakers by determining a type of sound to be output from each of the plurality of external speakers according to the determined multi-channel type.

Specifically, the controller 170 may establish the role of each of the plurality of external speakers based on at least one of the location, sound pressure, and reproduction band of each of the plurality of external speakers.

For example, when the first external speaker is positioned on the left rear side with respect to the viewing position and the second external speaker is positioned on the right rear side with respect to the viewing location, according to the location information of the external speakers, and the reproduction band of the third external speaker is bass sound, the controller 170 may establish the role of each of the speakers such that the first external speaker outputs a sound corresponding to the surround left SL, the second external speaker outputs a sound corresponding to the surround right SR, and the third external speaker outputs a sound corresponding to the subwoofer SW.

The controller 170 may establish a role of each of the plurality of external speakers based on distance information between the display device 100 and the external speaker and direction information of the external speaker.

For example, when the first external speaker is positioned on the left rear side with respect to the viewing position and the second external speaker is positioned on the right rear side with respect to the viewing location but is farther from the viewing location than the first external speaker according to the distance information and direction information of the external speakers, the controller 170 may establish the role of each of the speakers such that the first external speaker outputs a sound corresponding to the surround wide left SWL and the second external speaker outputs a sound corresponding to the surround back left SBL.

The controller 170 may calculate a correction value of an audio signal level according to each audio channel (S21).

The controller 170 may correct an audio signal based on a sound pressure of each of the external speakers and an audio channel established for each of the external speakers.

The controller 170 may compare the sound pressure of the audio output interface 185 with the sound pressure of each of the external speakers, and calculate a correction value for correcting the audio signal of the external speaker such that the volume level according to the sound pressure of the audio output interface 185 and the sound pressure of the external speaker are at the same level.

Meanwhile, the controller 170 may calculate a correction value for correcting the audio signal of the external speaker such that the sound pressure of the external speaker is greater or less than the sound pressure of the audio output interface 185 according to the sound characteristics of the audio channel.

The controller 170 may obtain the user's viewing location and correct an audio signal to be transmitted to each of the plurality of external speakers based on the user's viewing location.

FIG. 14 is a diagram for describing a method of correcting an audio signal in a display device according to an embodiment of the present disclosure.

The controller 170 may transmit an audio signal to a TV speaker and transmit the audio signal to an external speaker through Bluetooth (BT). After receiving the audio signal, the external speaker (BT device) may output sound according to the audio signal.

The voice acquisition module 290 of the remote control device 200 may obtain sound output from the audio output interface 185 and sound output from the external speaker. The remote control device 200 may transmit the obtained sound to the controller 170 through the user input interface 150. According to an embodiment, the voice acquisition module 190 of the display device 100 may obtain the sound output from the audio output interface 185 and the sound output from the external speaker.

The controller 170 may obtain and analyze a sound pressure level of the audio output interface 185 and a sound pressure level of each external speaker based on the obtained sound. the controller 170 may obtain a volume correction value of each external speaker based on a result of analyzing the sound pressure levels, and then transmit the volume correction value to the external speaker.

When receiving the audio signal and then outputting sound, the external speaker may adjust a volume according to the volume correction value to output the sound.

Again, details will be described with reference to FIG. 6.

The controller 170 may transmit the audio signal to the external speaker (S23).

When the number of channels according to the determined multi-channel type is greater than the number of channels of the input audio signal, the controller 170 may upmix the input audio signal.

That is, the controller 170 may upmix the input audio signal according to the multi-channel type. The controller 170 may transmit an audio signal suitable for each audio channel to the audio output interface 185 and the external speaker after the up-mixing or bypass process has been performed.

The above description is merely illustrative of the technical idea of the present disclosure, and various modifications and changes may be made thereto by those skilled in the art without departing from the essential characteristics of the present disclosure.

Therefore, the embodiments of the present disclosure are not intended to limit the technical spirit of the present disclosure but to illustrate the technical idea of the present disclosure, and the technical spirit of the present disclosure is not limited by these embodiments.

The scope of protection of the present disclosure should be interpreted by the appending claims, and all technical ideas within the scope of equivalents should be construed as falling within the scope of the present disclosure.

The invention claimed is:

1. A display device comprising:
   a display;
   an audio output interface configured to output sound;
   a wireless communication interface connected to a plurality of external speakers; and
   a controller configured to:
   establish a role of each of the plurality of external speakers based on distance information between the display device and the external speaker and direction information of the external speaker including a direction in which the external speaker is located with respect to the display device;
   transmit an audio signal to each of the plurality of external speakers according to the established role; and
   obtain a Bluetooth signal strength of each of the plurality of external speakers, and obtain distance information between the display device and the external speaker based on the Bluetooth signal strength.

2. The display device of claim 1, wherein the controller is configured to establish the role of each of the plurality of external speakers based on at least one of a location, a sound pressure, and a reproduction band of each of the plurality of external speakers.

3. The display device of claim 1, further comprising:
a user input interface configured to receive a signal from a remote control device,
wherein the controller is configured to:
detect a location of the remote control device;
recognize the location of the remote control device as a user's viewing location; and
correct the audio signal to be transmitted to each of the plurality of external speakers based on the user's viewing location.

4. The display device of claim 1, wherein the controller is configured to obtain location information of each of the plurality of external speakers, and recognize an average position of a plurality of pieces of location information corresponding to the plurality of external speakers as a user's viewing location.

5. The display device of claim 1, wherein the controller is configured to obtain a user's viewing location and correct an audio signal to be transmitted to each of the plurality of external speakers based on the user's viewing location and the role of each of the plurality of external speakers.

6. The display device of claim 1, wherein the controller is configured to determine a multi-channel type based on at least one of a number and a reproduction band of the plurality of external speakers connected through the wireless communication interface.

7. The display device of claim 6, wherein the controller is configured to establish an audio channel for each of the plurality of external speakers according to the multi-channel type.

8. The display device of claim 6, wherein the controller is configured to up-mix an input audio signal according to the multi-channel type.

9. The display device of claim 6, wherein the controller is configured to determine one of 3.1ch, 5.1ch, 5.1.2ch, 7.1.4ch, 9.1.2ch, 9.1.4ch, 11.1ch, and 22.2ch as the multi-channel type.

10. The display device of claim 6, wherein the controller is configured to control the display to display a guide for guiding a speaker arrangement according to the determined multi-channel type.

11. The display device of claim 10, wherein the controller is configured to control the display to display a guide including at least one of a current location of each of the plurality of external speakers, a recommended speaker location, and a location change guide icon.

12. The display device of claim 1, wherein the controller is configured to obtain a reproduction band of each of the plurality of speakers by recognizing test sound output from the plurality of external speakers.

13. A operating method of a display device comprising:
connecting, by a wireless communication, to a plurality of external speakers;
establishing, by a controller, a role of each of the plurality of external speakers based on distance information between the display device and the external speaker and direction information of the external speaker including a direction in which the external speaker is located with respect to the display device;
transmitting, by a controller, an audio signal to each of the plurality of external speakers according to the established role;
obtaining a Bluetooth signal strength of each of the plurality of external speakers; and
obtaining distance information between the display device and the external speaker based on the Bluetooth signal strength.

14. The operating method of the display device of claim 13, wherein the establishing of the role of the each of the plurality of external speakers is based on at least one of a location, a sound pressure, and a reproduction band of each of the plurality of external speakers.

15. The operating method of the display device of claim 13, further comprising:
receiving, by a user input interface, a signal from a remote control device;
recognizing the location of the remote control device as a user's viewing location; and
correcting the audio signal to be transmitted to each of the plurality of external speakers based on the user's viewing location.

16. A display device comprising:
a display;
an audio output interface configured to output sound;
a wireless communication interface connected to a plurality of external speakers; and
a controller configured to:
establish a role of each of the plurality of external speakers based on distance information between the display device and the external speaker and direction information of the external speaker including a direction in which the external speaker is located with respect to the display device;
transmit an audio signal to each of the plurality of external speakers according to the established role; and
obtain direction information of the external speaker using at least one of AOA (Angle of Arrival) and AOD (Angle of Departure).

* * * * *